UNITED STATES PATENT OFFICE.

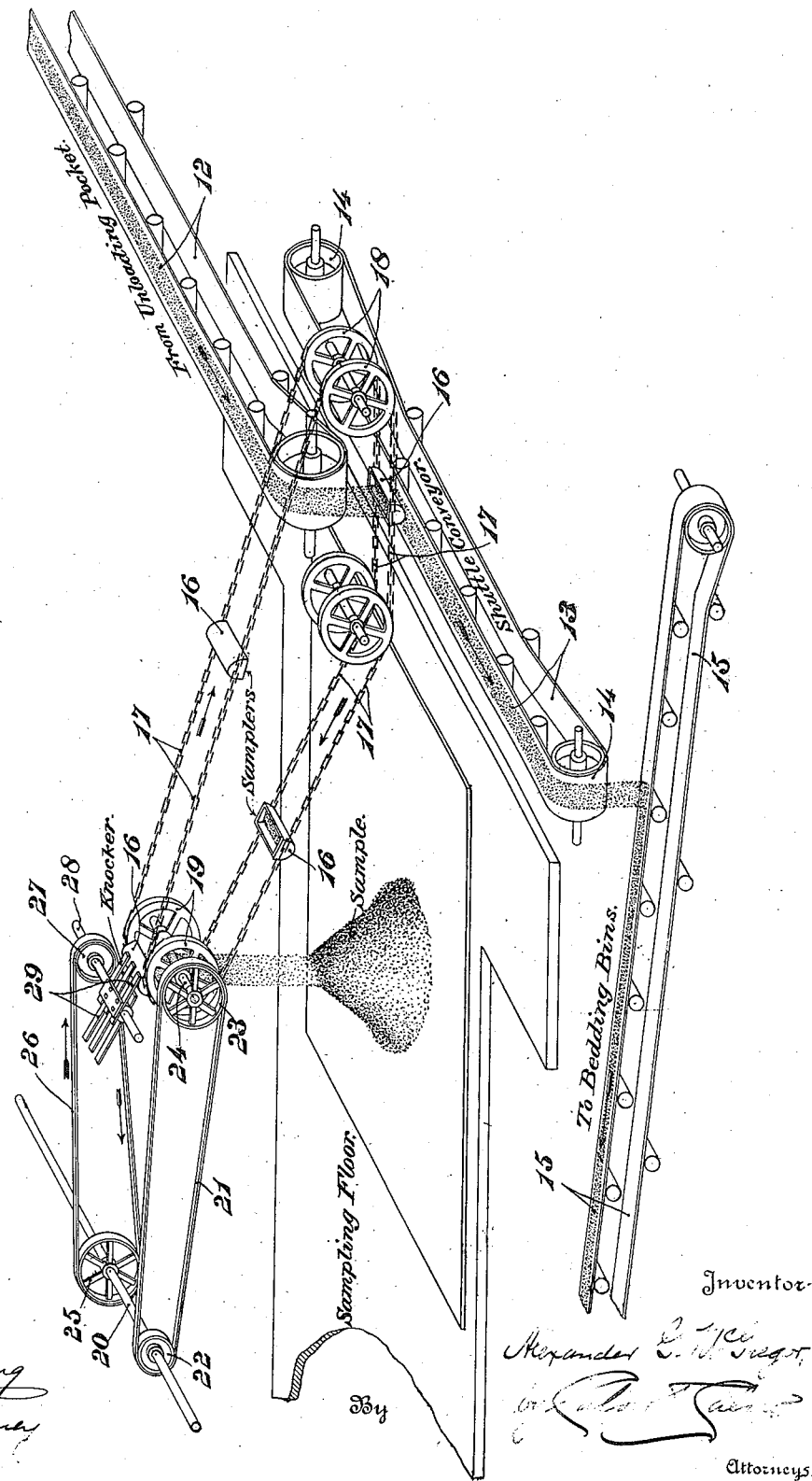

ALEXANDER G. McGREGOR, OF GLOBE, ARIZONA.

SAMPLING APPARATUS.

1,155,670.  Specification of Letters Patent.  Patented Oct. 5, 1915.

Application filed August 10, 1914. Serial No. 856,081.

*To all whom it may concern:*

Be it known that I, ALEXANDER G. MCGREGOR, a citizen of the United States, residing at Globe, in the county of Gila and State of Arizona, have invented or discovered certain new and useful Improvements in Sampling Apparatus, of which the following is a specification, reference being had therein to the accompanying drawing.

This invention relates to an apparatus for sampling ore concentrates or similar sticky substances, in wet condition, and has for its object to insure a complete emptying of the buckets or receptacles which, at intervals, are caused to cut through a stream of material delivered from an endless belt or other suitable conveyer.

While there are at the present time many devices in use for sampling ores or other materials, these sampling devices are not suitable for sampling sticky concentrates for the reason that they do not provide means whereby the buckets or receptacles, when reversed for the dumping operation, can be properly cleaned; and as varying amounts of the sticky material will adhere to the buckets the samples dumped cannot be relied upon as showing accurate percentages of the material being sampled. The present invention obviates an existing difficulty by providing means for percussively jarring the sampling buckets or receptacles when they are reversed for dumping, as will hereinafter more fully appear.

The accompanying drawing is a perspective and somewhat diagrammatic view of a preferred form of apparatus embodying the present invention.

Referring to the drawing, 12 denotes an endless conveyer belt adapted to carry concentrates from an unloading pocket to a shuttle conveyer belt 13 running over suitable pulleys 14 and delivering material to a conveyer belt 15 running to a bedding bin or bins. Arranged to cut through, at intervals, the stream of material being delivered from the conveyer 12 to the conveyer 13, is a series of sampling buckets or receptacles 16 carried by chains 17 running over pulleys or sprocket wheels 18 and 19, the pulleys or sprocket wheels 19 being driven from a power shaft 20 by a belt 21 running over pulleys 22 and 23, said pulley 23 being on the shaft 24 carrying the said pulleys or sprocket wheels 19. The power shaft 20 is provided with a second pulley 25 over which runs a belt 26 to a pulley 27 on a shaft 28 provided with knockers 29 which preferably consist of pieces of belting or flexible thin strips of metal, as brass or steel.

While it is preferred to provide a series of sampling buckets or receptacles 16, this is not positively necessary, as a single sampling bucket or receptacle, carried at a suitable speed, would be practically successful for small sample percentages.

From the foregoing it will be understood that when the apparatus is in operation and the parts are running in the directions indicated by the arrows, the sampling buckets or receptacles 16 will be caused periodically to cut through the stream of concentrates or other sticky material being delivered from the conveyer 12 to the conveyer 13, and as the said sampling buckets or receptacles arrive at the pulleys or sprocket wheels 19 they will be reversed for dumping, and while in such reversed or dumping position the bottoms of the same will be struck by the knockers 29 on the revolving shaft 28, so that any material which might otherwise adhere to the insides of the buckets will be forcibly detached therefrom by the percussive jarring action of the knockers on the bottoms of the reversed buckets, and the latter will therefore be cleanly emptied in readiness for refilling. Any desired percentage of the material being delivered from the unloading pocket may be taken out as samples, according to the distance apart on said conveyer of the sampling buckets, or according to the width of the sampling buckets. The sample taken will be in proportion to the total material going to the sampler as the total space occupied by buckets on the conveyer is to the total length of the conveyer, as will be obvious.

The invention is not to be understood as being limited to the particular apparatus herein shown, and which embodies but one of many forms of apparatus to which the invention is applicable.

Having thus described my invention I claim and desire to secure by Letters Patent:

1. In an apparatus for sampling concentrates or similar sticky materials, the combination with means for delivering a stream of material, of one or more sampling receptacles, an endless carrier for conveying said receptacle or receptacles, right side up, through said stream of material, periodically, said receptacle or receptacles being attached to said carrier so as to be reversed, for dumping, by the reverse travel of said conveyer, means for supporting and driving said carrier, and means for percussively jarring said receptacle or receptacles when in reversed or dumping position.

2. In an apparatus for sampling concentrates or similar sticky materials, the combination with means for delivering a stream of material, of one or more sampling receptacles, an endless carrier for conveying said receptacle or receptacles, right side up, through said stream of material, periodically, said receptacle or receptacles being attached to said carrier so as to be reversed, for dumping, by the reverse travel of said carrier, means for supporting and driving said carrier, and rotating knockers acting on the bottoms of the reversed receptacle or receptacles, for percussively jarring same when in dumping position.

3. In an apparatus for sampling concentrates or similar sticky materials, the combination with means for delivering a stream of material, of one or more sampling receptacles, an endless carrier for conveying said receptacle or receptacles, right side up, through said stream of material, periodically, said receptacle or receptacles being attached to said carrier so as to be reversed for dumping by the reverse travel of said carrier, means for supporting and driving said carrier, and flexible rotating knockers acting on the bottoms of the reversed receptacle or receptacles for percussively jarring same when in dumping position.

4. In an apparatus for sampling concentrates or similar sticky materials, the combination with an endless conveyer for delivering a stream of material, and means for supporting and driving said conveyer, of sample holding means, mechanism for carrying said sample-holding means through said stream of material, at intervals, and for dumping same, and flexible rotating knockers for jarring the sample-holding means when in dumping position.

In testimony whereof I affix my signature, in presence of two witnesses.

ALEXANDER G. McGREGOR.

Witnesses:
L. S. MUSSER,
C. W. CROMWELL.